United States Patent
Maisch et al.

[11] Patent Number: 5,952,799
[45] Date of Patent: Sep. 14, 1999

[54] ELECTRICAL BRAKE SYSTEM

[75] Inventors: Wolfgang Maisch, Schwieberdingen; Stefan Otterbein, Stuttgart; Peter Blessing, Heilbronn, all of Germany

[73] Assignee: Robert Bosch GmbH, Stuttgart, Germany

[21] Appl. No.: 08/920,619

[22] Filed: Aug. 27, 1997

[30] Foreign Application Priority Data

Aug. 27, 1996 [DE] Germany .................... 196 34 567

[51] Int. Cl.[6] .............. B60T 13/66; B60T 8/88; H02P 3/00

[52] U.S. Cl. .................. 318/362; 318/16; 318/479; 303/20; 303/146

[58] Field of Search ............... 318/370–379, 318/16, 801; 303/7, 111, 20, 110, 21 AF, 92; 701/70; 364/426.01; 370/85

[56] References Cited

U.S. PATENT DOCUMENTS

| | | | |
|---|---|---|---|
| 3,847,445 | 11/1974 | Bissell et al. | 303/21 AF |
| 4,270,808 | 6/1981 | Brearley | 303/92 |
| 4,571,010 | 2/1986 | Dittner et al. | 303/110 |
| 4,715,031 | 12/1987 | Crawford et al. | 370/85 |
| 5,255,962 | 10/1993 | Neuhaus et al. | 303/111 |
| 5,265,693 | 11/1993 | Rees et al. | 180/197 |
| 5,455,770 | 10/1995 | Hadeler et al. | 364/426.01 |
| 5,588,719 | 12/1996 | Bailleux | 303/122 |
| 5,610,493 | 3/1997 | Wieloch | 318/801 |
| 5,726,541 | 3/1998 | Glenn et al. | 318/16 |
| 5,735,579 | 4/1998 | Wood et al. | 303/7 |
| 5,738,417 | 4/1998 | Wood et al. | 303/7 |
| 5,752,748 | 5/1998 | Schramm et al. | 303/20 |
| 5,790,970 | 8/1998 | Brachert et al. | 701/70 |

FOREIGN PATENT DOCUMENTS

| | | | |
|---|---|---|---|
| 0641698 | 7/1994 | European Pat. Off. | B60T 8/88 |
| 2305988 | 4/1997 | United Kingdom | B60T 13/74 |
| 9513946 | 5/1995 | WIPO | B60T 8/88 |

*Primary Examiner*—Paul Ip
*Attorney, Agent, or Firm*—Fulbright & Jaworski, LLP.

[57] ABSTRACT

An electronic brake system for a vehicle which has control modules for adjusting the braking force at the wheels of the vehicle, a control module which determines at least the driver's braking command, and at least one communications system which connects the modules to each other, where, to supply the elements with energy, at least two independent vehicle electrical systems ($E_1$, $E_2$) are provided, at least one of the elements being connected to an electrical system different from that to which the other elements are connected.

12 Claims, 12 Drawing Sheets

ELECTRICAL BRAKE SYSTEM

FIELD OF THE INVENTION

The invention pertains to an electrical brake system according to the introductory clause of the independent claim.

DESCRIPTION OF THE PRIOR ART

An electrical brake system is known from, for example, WO-A 95/13,946. The electrical brake system described in that document consists of a central module and brake modules assigned to brake circuits or to groups of wheels, the modules exchanging information with each other by way of a communications system. Individual measures are taken to ensure the availability of the brake system in the event that an individual component fails. The types of defects taken into account include the failure of a wheel module, the failure of the communications system, the failure of the central module, and the failure of the pedal sensor unit.

SUMMARY OF THE INVENTION

It is the task of the invention to achieve a further optimization of a decentralized electrical brake system, especially for a braking apparatus with brakes actuated by electric motors, with a view to availability and defect tolerance.

The brake system according to the invention gives the braking apparatus a high level of availability and defect tolerance. The use of this brake system in a braking apparatus with electrically motorized brake application is especially advantageous, inasmuch as considerable advantages are obtained in such a system with respect to availability and defect tolerance.

It is especially advantageous that two different independent vehicle electrical systems are used, so that the braking apparatus remains at least partially operational even if one of the electrical systems fails. Both vehicle electrical systems preferably operate at the same voltage (e.g., 12 V, 23 V, or 48 V).

It is also advantageous that at least two independent information routes are provided between the individual control elements, so that the braking apparatus remains at least partially operational even if one of the information routes fails.

It is especially advantageous, furthermore, that, to determine the driver's braking command, a defect-tolerant pedal unit is provided, which serves to determine the axle-specific values for the braking forces or braking torques and to initiate fall-back strategies in the event of defects, e.g., by reducing the braking force of the diagonally opposite wheel upon failure of an actuating element.

It is especially advantageous that modular, higher-level brake control functions constitute a component of the brake system. If these higher-level functions fail, the brakes continue to operate under automatic control at least with the use of axle-specific command variables.

It is especially advantageous that the electronic brake system can be adapted to different types of vehicles and to different types of braking apparatuses, where the intended wheel pair units can be assigned to the wheels of a diagonal or those of an axle.

By means of the decentralized division of the brake system, a large measure of the functionality of the brakes is advantageously maintained even when static or dynamic defects occur; the operational reliability of the braking apparatus is ensured; and defect states are stored or their presence possibly displayed so that they can be serviced.

Additional advantages can be derived from the following description of exemplary embodiments.

DESCRIPTION OF THE EXEMPLARY EMBODIMENTS

Figure 1:
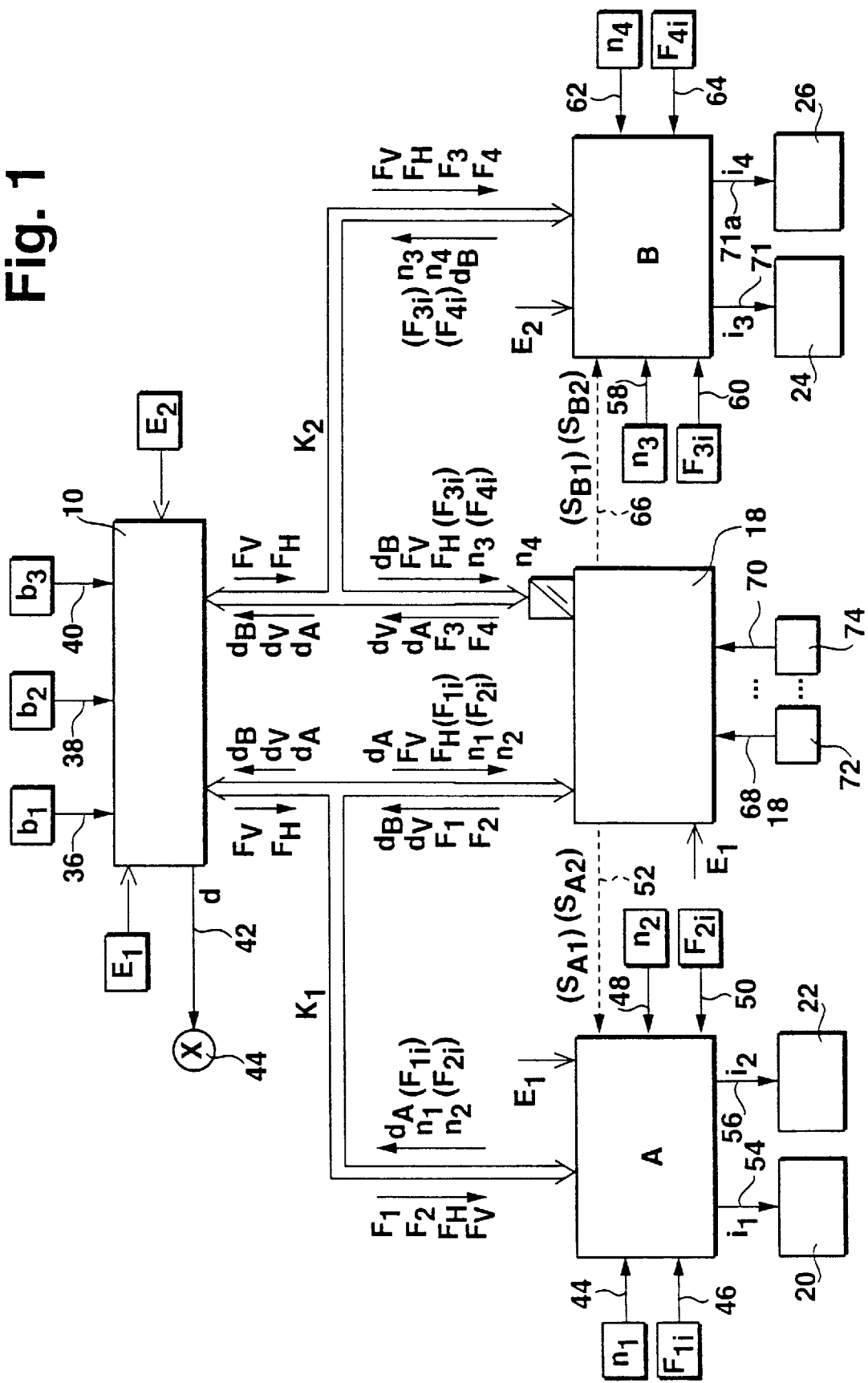
FIGS. 1–5 show two different variants of a first exemplary embodiment of the invention.

The invention is explained in greater detail below on the basis of the exemplary embodiments illustrated in the drawing. The electronic brake system according to the invention is shown in the form of four different exemplary embodiments, which differ essentially in that the component functions are integrated in different ways and thus also in that the fallback levels and defect modes, which lead to a fallback level, are different.

FIG. 1 shows the electronic brake system within the scope of a first exemplary embodiment in the form of a general circuit diagram. This exemplary embodiment is characterized by a decentralized structure, which consists of a pedal unit 10, a wheel pair unit A, a wheel pair unit B, and a processing unit 18. In the preferred exemplary embodiment, electrical actuators 20, 22, 24, 26 act by way of suitable gear stages on the application distances of disk or drum brakes without an intermediate hydraulic stage. The brake system shown controls the braking forces or torques individually for each wheel. Its electrical energy is supplied by two independent vehicle electrical systems $E_1$, $E_2$, which operate preferably on the same voltage (e.g., 12 V, 24 V, or 48 V). The exchange of data between the individual units is accomplished by two independent communications systems $K_1$, $K_2$. In a preferred exemplary embodiment, these are realized as serial bus systems (e.g., CAN). The communications systems are powered by different electrical systems, i.e., $K_1$, by $E_1$, $K_2$ by $E_2$. Communications system $K_1$ connects pedal unit 10, processing unit 18, and one of the wheel pair units, whereas communications system $K_2$ connects the pedal unit, the processing unit, and the other wheel pair unit. In a preferred exemplary embodiment, processing unit 18 is supplied by electrical system $E_1$, so that communications system $K_2$ is separated in terms of its voltage from this unit.

In addition to communications systems $K_1$, $K_2$, measurement values $b_1$, $b_2$, $b_3$, which represent the degree to which the brake pedal is actuated, are sent by appropriate measuring devices to pedal unit 10 over input lines 36, 38, 40. These measuring devices are distance sensors, force sensors, pressure sensors, etc. In the preferred exemplary embodiment, at least two of these measurement devices are different in type from each other. In addition, an output line 42 is connected to the pedal unit; this line connects the pedal unit to a warning lamp 44 and/or to a memory unit for storing defects (not shown) and carries a defect signal d. Over communications system $K_1$, pedal unit 10 sends command variables for partial braking forces $F_V$, and $F_H$ (or partial braking torques) for the wheels of the front and rear axles, respectively. Over communications system $K_1$, pedal unit 10 receives defect signals $d_N$, $d_A$, $d_V$, from wheel pair units A, B and from processing unit 18. Pedal unit 10 sends and receives the corresponding signals over communications system $K_2$. Because pedal unit 10 is designed to be tolerant of defects, it is connected to both vehicle electrical systems $E_1$, $E_2$.

Wheel pair unit A is connected to first electrical system $E_1$. Over input lines 44, 46, 48, 50, the unit receives measurement values pertaining to rotational speeds $n_1$, $n_2$ of the associated wheels and measurements pertaining to the actual values $F_{1i}$, $F_{2i}$ of the wheel braking force or the wheel braking torque. These actual values are either detected by way of appropriate sensors or calculated on the basis of other operating variables (e.g., the actuating signal value). In a preferred exemplary embodiment (as indicated in broken line in FIG. 1), wheel pair unit A also receives signal values $S_{A1}$, $S_{A2}$ from the processing unit over input line 52 to control the energy supply. Over output lines 54, 56, wheel pair unit A sends actuation values $i_1$, $i_2$ for electrical actuators 20, 22. These actuation values are, for example, pulse-width-modulated voltage signals, which represent a measure of the braking torque or braking force to be produced by the actuators. Wheel pair unit A is also connected to communications system $K_1$. Over the communications system, wheel pair unit A sends the measurement values, possibly after they have been processed, pertaining to rotational speeds $n_1$, $n_2$ of the wheels and a defect signal $d_A$. In another exemplary embodiment, wheel pair unit A also transmits actual values $F_{1i}$, $F_{2i}$ for the wheel braking forces or torques over communications system $K_1$. Wheel pair unit A receives the command variables $F_V$, $F_H$ for the front and rear axles over communications system $K_1$, and it receives command variables $F_1$, $F_2$ for the individual wheel braking forces or torques from the processing unit.

Wheel pair unit B is of similar design. It is connected to communications system $K_2$ and receives the command variables $F_V$, $F_H$ for the partial braking forces or torques of the front and rear axles and command variables $F_3$, $F_4$ for the individual wheel braking forces or torques from the pedal unit and processing unit. By way of the communications system, wheel pair unit B transmits wheel rotational speed signals $n_3$, $n_4$ of the associated wheels and a defect signal $d_B$. In addition, in an advantageous exemplary embodiment, the actual values $F_{3i}$, $F_{4i}$ for the braking forces or torques which have been produced at the associated wheels are transmitted over communications system $K_2$. Wheel pair unit B is connected to the second vehicle electrical system $E_2$. Over input lines 58, 60, 62, 64, it receives from measuring devices rotational speed signals $n_2$, $n_4$ of the wheels and actual values $F_{3i}$, $F_{4i}$ of the braking forces or torques produced at the associated wheels. In another exemplary embodiment, control signals $S_{B1}$, $S_{B2}$ for the energy supply are received over an input line 66 from the processing unit. Over output lines 71, 71a, wheel pair unit B sends correcting variables $i_3$, $i_4$ to electrical actuators 24, 26.

Processing unit 18 is connected to electrical system $E_1$ and to both communications systems $K_1$, $K_2$. Command variables $F_V$, $F_H$ pertaining to the front and rear axles are sent over both communications systems to processing unit 18. Defect signal $d_A$, rotational speed speeds $n_1$, $n_2$ of the wheels, and, in an additional exemplary embodiment, the actual values $F_{1i}$, $F_{2i}$ are sent from wheel pair unit A over communications system $K_1$. The speed signals $n_3$, $n_4$, defect signal $d_B$, and, in another exemplary embodiment, the actual values $F_{3i}$, $F_{4i}$ are sent to processing unit 18 from wheel pair unit B over communications system $K_2$. Processing unit 18 transmits over communications system $K_2$. In a corresponding manner, it sends defect signal $d_A$ of wheel pair unit A and its own defect signal $d_V$ to pedal unit 10 over communications system $K_2$; it sends nominal values $F_3$, $F_4$ for the individual wheels to wheel pair unit B. In addition, operating variables such as steering angle, transverse acceleration, yaw velocity, etc., which are required for driving dynamics control, are sent to processing unit 18 over lines 68–70 from measuring devices 72–74. In another exemplary embodiment, processing unit 18 also has output lines 52, 66.

FIGS. 2–5 show the pedal unit, the wheel pair units, and the processing unit in detail. The way in which the brake system operates is also described on the basis of these figures.

Figure 2:
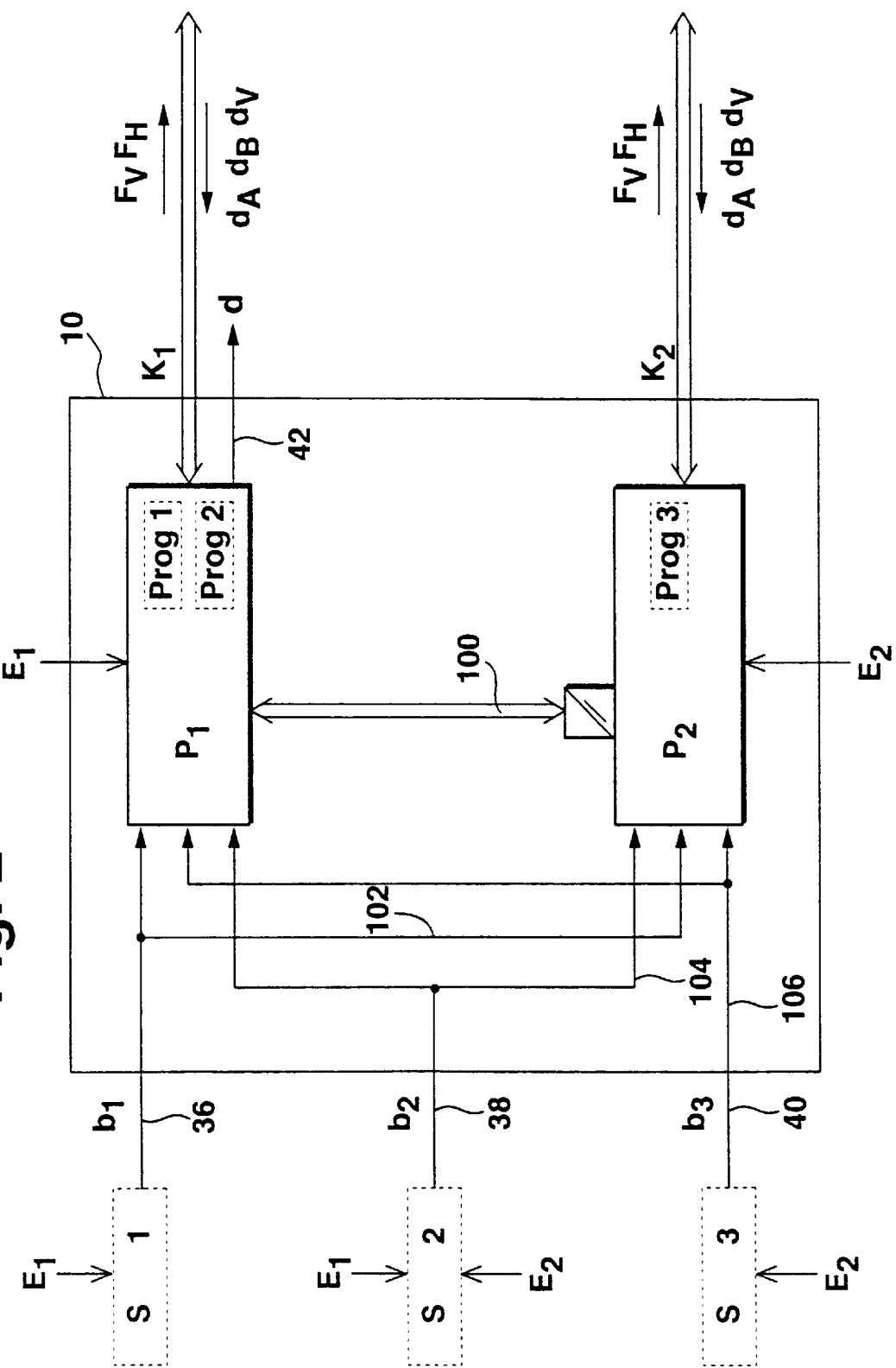

FIG. 2 shows a general circuit diagram of pedal unit 10. This consists essentially of two microcomputers $P_1$, $P_2$, which are connected to each other by a communications system 100. Communications system 100 is separated in terms of its voltage from one of the microcomputers ($P_2$ in FIG. 2), because the two microcomputers are supplied by different electrical systems ($P_1$ by $E_1$, P2 by $E_2$). Microcomputer $P_1$ is connected to communications system $K_1$, and has output line 42. In addition, input lines 36, 38, 40 and thus signals $b_1$, $b_2$, $b_3$, which represent the driver's braking command, are also sent to it. Sensors S1, S2, S3, which detect the signals representing the driver's braking command, are, in the preferred exemplary embodiment, connected to different electrical systems. For example, S1 is connected to electrical system $E_1$, S3 to electrical system $E_2$ and S2 to electrical systems $E_1$ and/or $E_2$. Micro computer $P_2$ is connected to communications system $K_2$ and to electrical system $E_2$. In addition, all driver command signals $b_1$, $b_2$, $b_3$ are sent to it over lines 102, 104, 106. The two microcomputers send and receive the values represented in FIG. 1 over communications systems $K_1$, $K_2$.

Pedal unit 10 serves to detect the braking command of the driver. The actuation of the brake pedal is detected by independent sensors S1, S2, S3, which measure, as mentioned above, preferably in a diversified realization, the angle of the brake pedal or the force exerted on the brake pedal. To improve the operational reliability and availability of the system, the sensors are supplied by different energy sources. Pedal unit 10 itself is designed to be defect-tolerant through a realization in the form of a redundant microcomputer system, the two microcomputers being connected to different vehicle electrical systems. The microcomputers also contain the required groups of peripherals, memory units, and watchdogs, which have been omitted from FIG. 2 for the sake of clarity. At least three independent programs Prog1, Prog2, Prog3 are incorporated into the microcomputer system to calculate the nominal value for the total braking force (or total braking torque) FRES desired by the driver, as indicated by his actuation of the pedal, by the use of a stored characteristic pedal curve on the basis of the detected measurement variables. The programs operate by means of a majority selection principle, e.g., a two-out-of-three decision. For this purpose, the three measurement values are accepted as input in parallel by all three of the programs, and the desired (individual) braking force (or torque) is determined from these three measurement values on the basis of a characteristic pedal curve. The braking forces thus determined are then compared with each other in each program to determine whether or not any of the calculations is defective. Then each program uses these correct measurement values to determine a resulting total braking force on the basis of, example, the maximum selection principle or by calculating an average value. The calculated total braking force is made available via communications system 100 to each of the other programs, which, on the basis of a two-out-of-three selection principle, determine the correct total braking force. In an alternative embodiment, the desired total braking torque is calculated instead of the total braking force. Then, in accordance with a suitably predetermined distribution of the braking force over the axles of the vehicle, the total braking force is converted in each microcomputer into the desired braking forces or torques for the wheels of the front axle ($F_V$) and for the wheels of the rear axle(s) ($F_H$). These values are sent over communications systems $K_1$, $K_2$ to the other units of the brake system. The values determined by one of the programs (maximum value selection principle) or an average of the values from two programs are transmitted by microcomputer $P_1$.

Pedal unit 10 is designed to be defect-tolerant. When a microcomputer, a communications systems, a sensor, an electrical system, etc. fails, the driver's braking command is determined by the still-functioning components and made available to the brake system, or at least to parts of it.

In the pedal unit, furthermore, the internal defect states and defect signal messages $d_A$, $d_B$, $d_V$ of the connected units are detected, stored, and evaluated. After the defect states have been accepted as input or whenever a defect relevant to safety has been read in, the driver is sent a signal in the form of defect signal d. The overall status of the brake system is analyzed on the basis of defect signal messages $d_A$, $d_B$, $d_V$, and, insofar as safe operation is impaired, the transition to a fallback level with reduced functionality is initiated. For this purpose, fallback messages (not shown in the figures) are sent possibly by the pedal unit via communications systems $K_1$, $K_2$ to all connected units; the messages initiate a transition in these units to other software modules with reduced function.

Figure 3:
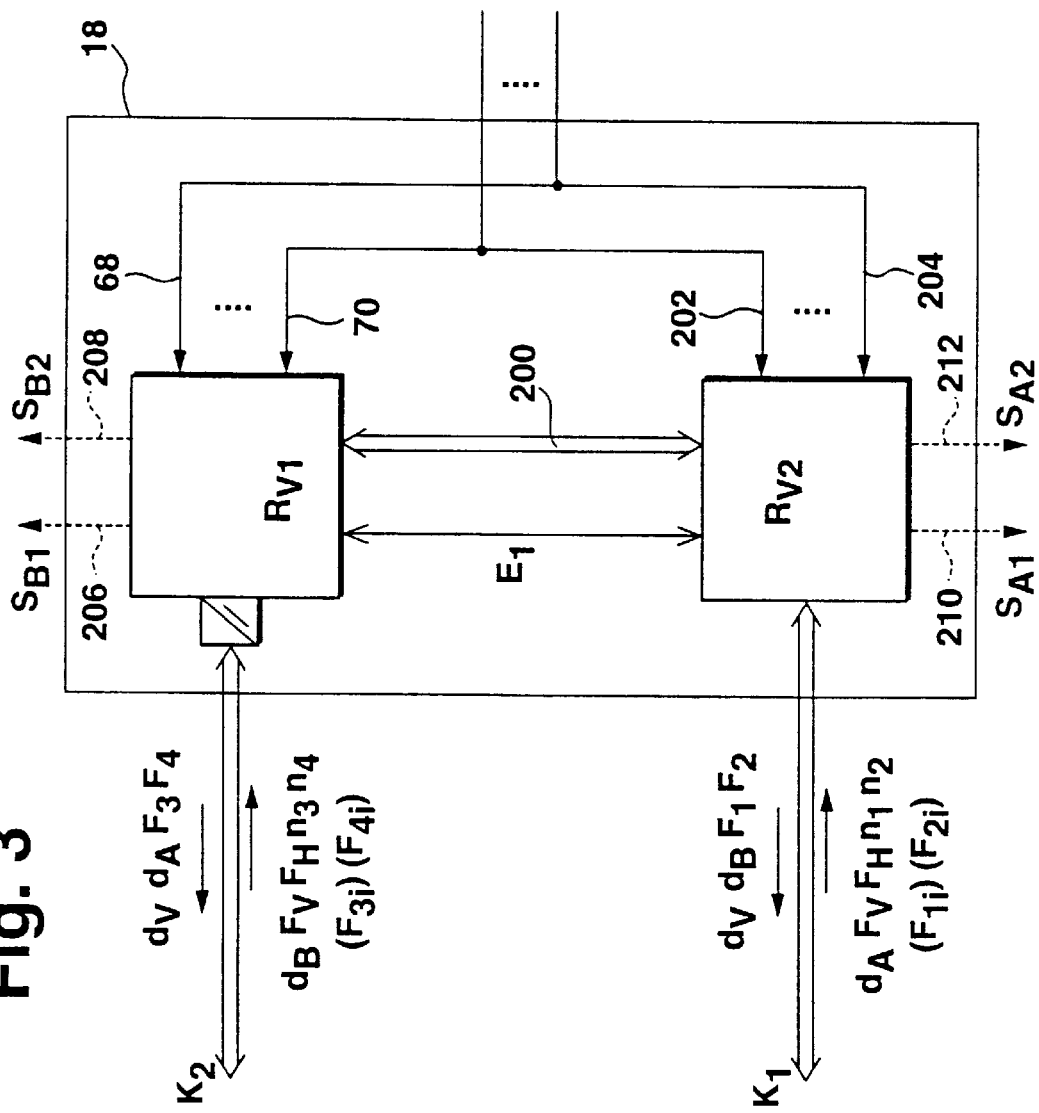

FIG. 3 shows the structure of processing unit 18. This, too, consists of two microcomputers $R_{V1}$, $R_{V2}$, which are connected to each other by a communications bus 200. These two microcomputers are connected to electrical system $E_1$. Microcomputer $R_V$ is connected to communications system $K_2$ of the brake system with voltage separation, whereas microcomputer $R_{V2}$ is connected to communications system $K_2$. Microcomputers $R_{V1}$, $R_{V2}$ accept measurement signals in parallel over input lines 68–70, 202–204 for measurement values which pertain to the driving dynamics of the vehicle. Measurement variables of this type include, for example, steering angles, rates or rotation, trans verse accelerations, axle loads, etc. The microcomputers receive and transmit the values described on the basis of FIG. 1 via communications systems $K_1$, $K_2$. The defect signals $d_A$, $d_B$ of the wheel pair units are sent by the receiving microcomputer via communications system 200 to the transmitting microcomputer. This serves primarily to ensure that both microcomputers are informed concerning defect states in a wheel pair unit. The actual values $F_{1i}$, $F_{2i}$, $F_{3i}$, $F_4$, shown in parentheses for the braking forces or torques are, in an alternative exemplary embodiment, also accepted as input by processing unit 18. In this exemplary embodiment, microcomputers $R_{V1}$, $R_{V2}$ are provided with output lines 206, 208; 210, 212, over which they intervene in the event of a defect in the energy supply of wheel pair unit B and A.

In processing unit 18, the higher-level functions of the brake system are calculated, especially command variables for the individual wheels. By a method known in and of itself, the wheel-specific rotational speed behavior is included in these calculations for use by an antilock controller and/or drive slip controller and/or to avoid spinning under additional consideration of variables such as the steering wheel angle, transverse acceleration, and rotational rate for use by a driving dynamics controller. In the partial braking range, the wheel-specific brake lining wear is also taken into account in the conversion of the axle-specific command variables $F_V$, $F_H$ to the wheel-specific command variables $F_1$, $F_2$, $F_3$, $F_4$ with the goal of achieving uniform brake lining wear. In addition, a so-called "hillholder" function is realized by processing unit 18. The load being carried by the vehicle is also taken into account to achieve the optimum distribution of the braking force between the front and rear axles. The processing unit also initiates corrective measures when a brake channel fails (a wheel pair unit or components thereof). In the presence of a corresponding defect signal $d_A$ or $d_B$, at least one microcomputer modifies the command variables for the individual braking forces in such a way that the failure of the one wheel brake is taken into account. In this case, for example, the command variable for the other wheel brake of the same axle is reduced to zero for the sake of stability.

The calculations required to implement this function are carried out independently of each other in both microcomputers even in the event that a wheel pair unit has failed; the results are compared with each other via the communications system. If the results are inconsistent, the processing unit is turned off. A defect signal $d_V$ is then transmitted by microcomputer $R_{V1}$ over communications system $K_2$. The higher-level functions are therefore no longer carried out when the processing unit is defective. The operation of the brakes, however, is nevertheless guaranteed, because the pedal unit sends the axle-specific command variables directly to the wheel pair units. The actual values which are transmitted in alternative exemplary embodiments serve to realize an analytical redundancy of the wheel pair units in processing unit 18, as will be described below.

Figure 4:
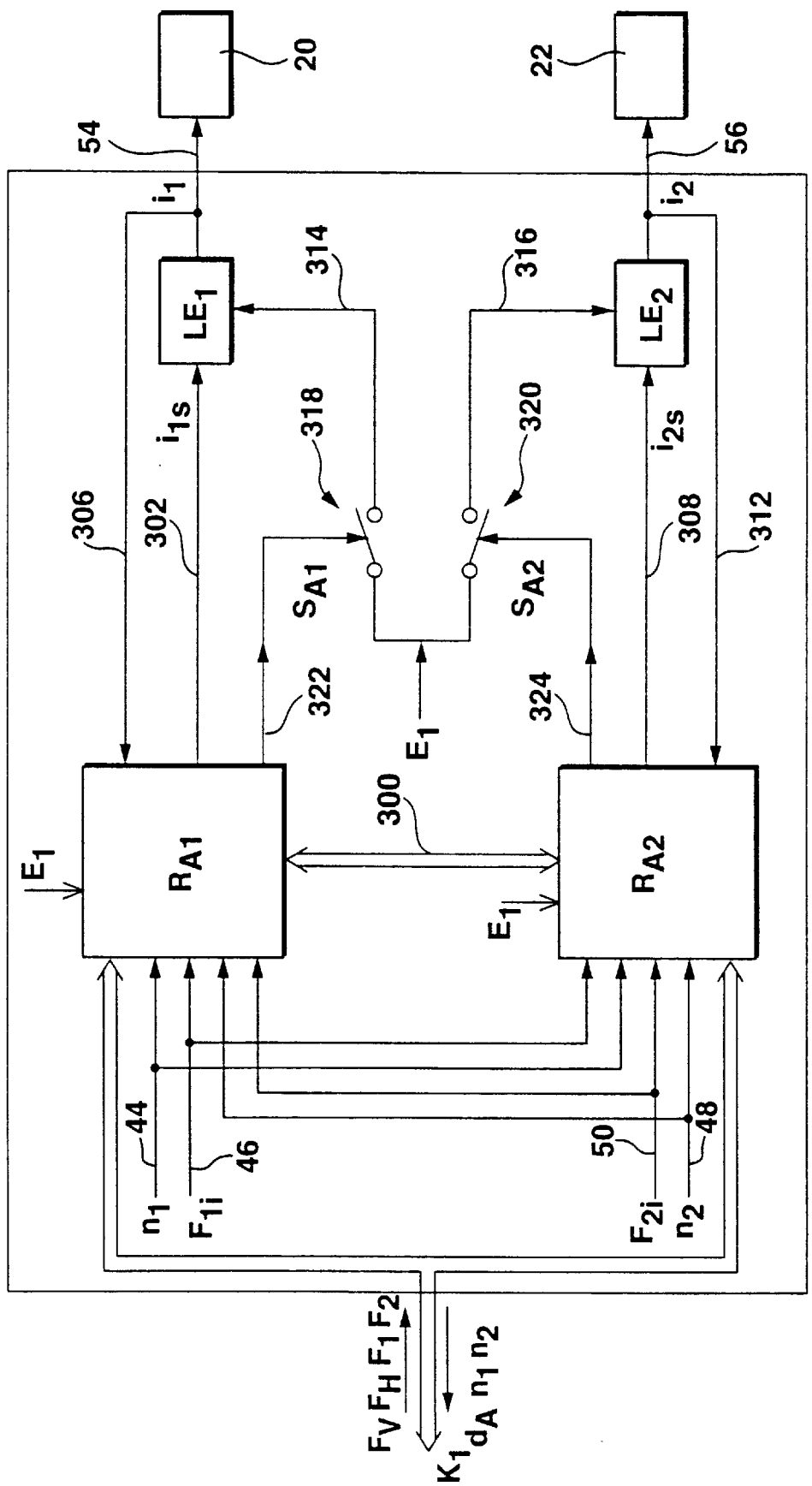

The structure of a wheel pair unit for the preferred exemplary embodiment is illustrated in FIG. 4. The diagram of the structure of the wheel pair unit is based on the example of wheel pair unit A. Wheel pair unit B has a similar design, but instead of the variables associated with wheel pair unit A, the variables from FIG. 1 relating to the wheel pair unit are to be inserted in the corresponding places.

Wheel pair unit A is connected to communications system $K_1$. Via this system, the unit receives and sends the variables described in FIG. 1. The wheel pair unit comprises essentially two microcomputers $R_{A1}$, $R_{A2}$, which are connected to electrical system $E_1$ and exchange data over a communications system 300. From the assigned wheels, the two microcomputers are supplied parallel to each other via corresponding input lines (44, 46, 48, 50) with measurement signals pertaining to wheel speeds $n_1$, $n_2$ and the actual values for the braking force or torque $F_{1i}$, $F_{2i}$. A line 302, over which a correcting variable $I_{1S}$ is transmitted, leads from microcomputer $R_{A1}$ to an electronic power supply $L_{E1}$. The output line of the electronic power supply is output line 54, which leads to a first actuator 20, which actuates the wheel brake. A line 306 can lead back from line 54 to microcomputer $R_{A1}$. In a corresponding manner, microcomputer $R_{A2}$ has an output line 308, over which a correcting variable $i_{2S}$ is sent to a second electronic power supply $L_{E2}$. The output line of this electronic power supply is line 56, which leads to a second actuator 22. It is again possible for a line 312 to lead back from line 56 to microcomputer $R_{A2}$. Electronic power supplies 304, 310 are supplied with current by electrical system $E_1$ via supply lines 314, 316. Switching elements 318, 320 are inserted into these supply lines; the switches can be actuated by microcomputers $R_{A1}$, $R_{A2}$ by means of signals $S_{A1}$, $S_{A2}$ via corresponding lines 322, 324.

The automatic controls of the wheel-specific braking forces or torques are realized within the wheel pair units. The command variables are made available for this purpose via the communications systems. If the processing unit is in standard operating mode, the wheel pair units are sent the wheel-specific command variables $F_1$, $F_4$. If the processing unit has failed, the substitute values, i.e., the axle-specific command variables $F_V$, $F_H$, are available from the pedal unit. The microcomputers of the wheel pair units, each of which is assigned to a wheel brake, form the current or voltage correcting variables for the electronic power supplies of the electrical actuators on the basis of the measured actual values for the braking force or torque at each wheel brake and the corresponding command variables. The correcting variables are preferably calculated within the scope of appropriate automatic control circuits. In a further exemplary embodiment, the actual values of the current or voltage correcting variables can also be taken into account, that is, the current values returning over lines 306, 312 and passing through the actuators. In this case, an automatic current control circuit can be subordinated to the automatic braking force or torque control circuit. As a way to improve the control behavior or to monitor the actuation, it is also possible alternatively or additionally to detect the rotational angles or displacements of the electrical actuators as actual values and to make these available to the microcomputers in addition to the current values.

Wheel pair units A, B are fed by different energy sources. In addition, they are connected by different communications links to the processing unit and pedal unit. The wheels assigned to the wheel pair units can, depending on the type of vehicle, belong to one axle or to a diagonal of the vehicle. To detect defects, the two microcomputers exchange the results of the actuating variable calculations over communications link 300. They compare these results, and if the calculation results agree within a preselectable tolerance range, they actuate the electronic power supplies. As an example of an actuating signal, a pulse width-modulated voltage signal can be cited. If a defect in a electronic power supply leads to the actuation of an actuator, this can be recognized by a comparison of the correcting variable with the controlled variable. In the case of an unallowable relationship between the correcting variable and the controlled variable in a wheel pair channel, the corresponding microcomputer shuts the electronic power supply down via control signal $S_{A1}$, $S_{A2}$, $S_{B1}$, or $S_{B2}$ via switches 318, 320. In the case of a defect, a defect message $d_A$ or $d_B$ is sent to the processing unit or pedal unit, this message preferably also containing information concerning the type of defect or the extent of the shutdown measures, so that this can be taken into account by the processing unit in its determination of the nominal values.

Figure 5:
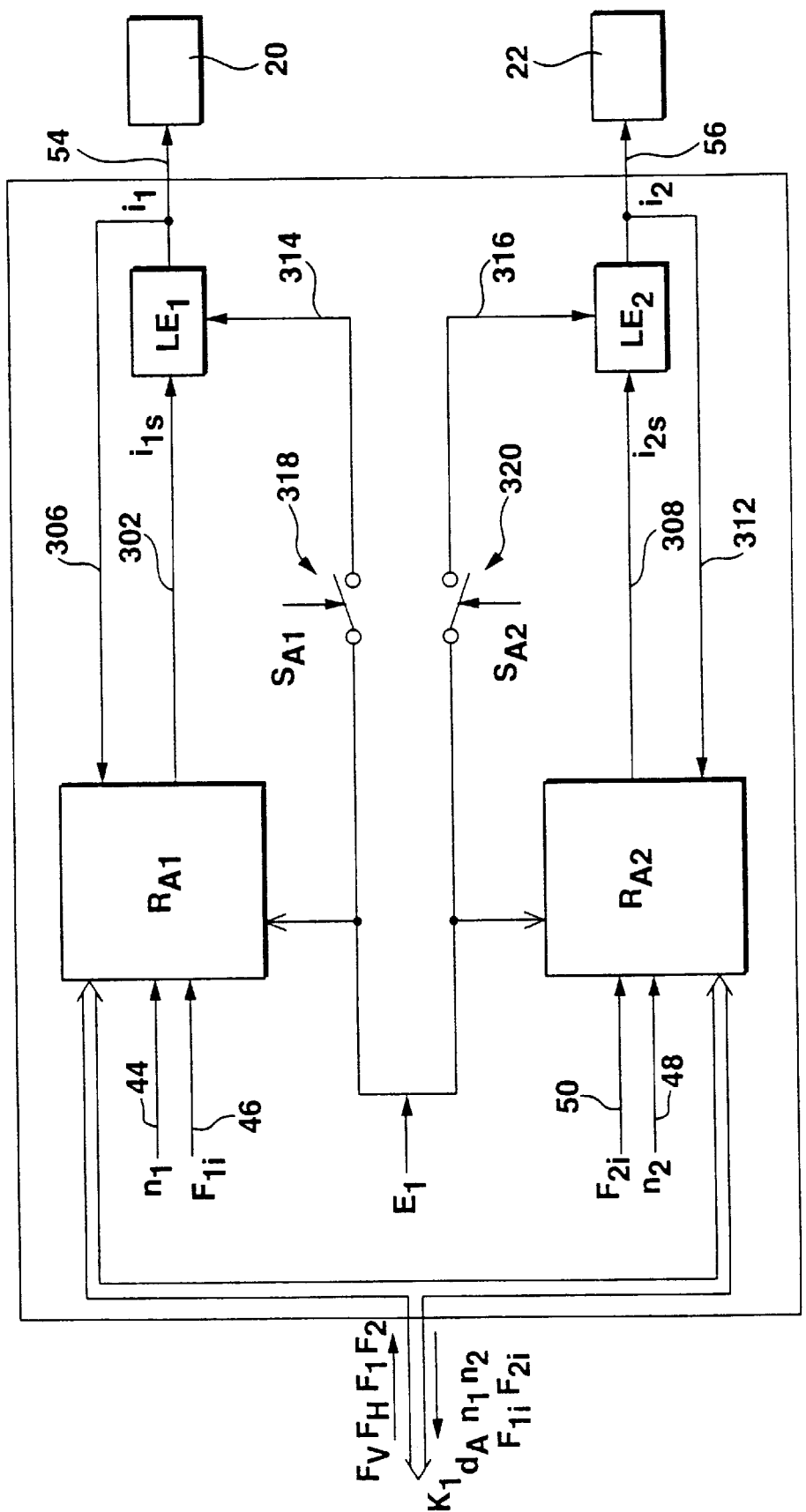

A second advantageous embodiment of the wheel pair units is shown in FIG. 5. In contrast to the design variant according to FIG. 4, each unit is realized in the form of a single channel; that is, the correcting variable for each actuator is calculated by an assigned microcomputer. In contrast to the design variant according to FIG. 4, the interchange of the calculation results and the parallel calculation of the correcting variables in both microcomputers followed by the comparison for defect detection are omitted. Therefore, the rotational speeds and actual values of each wheel are sent only to the assigned microcomputer. To guarantee the operational reliability and the availability of this system, the defect check is implemented by each microcomputer itself and in addition by the processing unit. The microcomputer itself monitors for the presence of defects on the basis of plausibility comparisons between the correcting and controlled variables (braking forces, braking torques, currents, etc.). If the microcomputer finds a defective state in its electronic power supply or in the system of connections, it transmits a corresponding defect message to the processing unit. Because, in this exemplary embodiment of the processing unit, the detected actual values for the braking force or torque are made available, defective behavior within the microcomputer which leads to an unallowable correcting or controlled variable is recognized within the processing unit by the analytical redundancy of the function of the wheel pair unit. This is done, for example, by means of a plausibility comparison between the wheel-specific command variables and the controlled variables (braking force, braking torque) under consideration of a dynamic model of the automatically controlled system, the rotational speeds of the other wheels, and the current operating status of the higher-level functions (e.g., wheel in ABS/ASR mode). In the case of a defect, the current being sent to the corresponding electronic power supply is interrupted by way of switch 318 or 320 by transmission of the corresponding actuating signal ($S_{A1}$–$S_{B2}$) by the processing unit.

Another advantageous embodiment is obtained by combining the functions of microcomputers $R_{A1}$, $R_{A2}$ in a single computing unit, which then, depending on the type of vehicle, takes over the functions either for a vehicle diagonal or for a vehicle axle.

In summary, the exemplary embodiment shown in FIGS. 1–5 shows not only a defect-tolerance pedal unit but also a processing unit, which takes over the job of processing the higher-level brake functions. In the case of a defect, this processing unit is turned off (fail-stop behavior). In the second design variant, this processing unit has an analytical redundancy for testing the function of the wheel pair units or of each microcomputer of the wheel pair units. In this design variant, separate shutdown paths to the electronic power supplies become active in the case of defect, so that the wheel pair units can be realized as single channels. In the case of the first design variant, the wheel pair units are independent system components, which are shut down in the event of a defect. Each one has two independent shutdown paths (via the correcting variable and via the power supply) for the actuator control.

Figure 6:
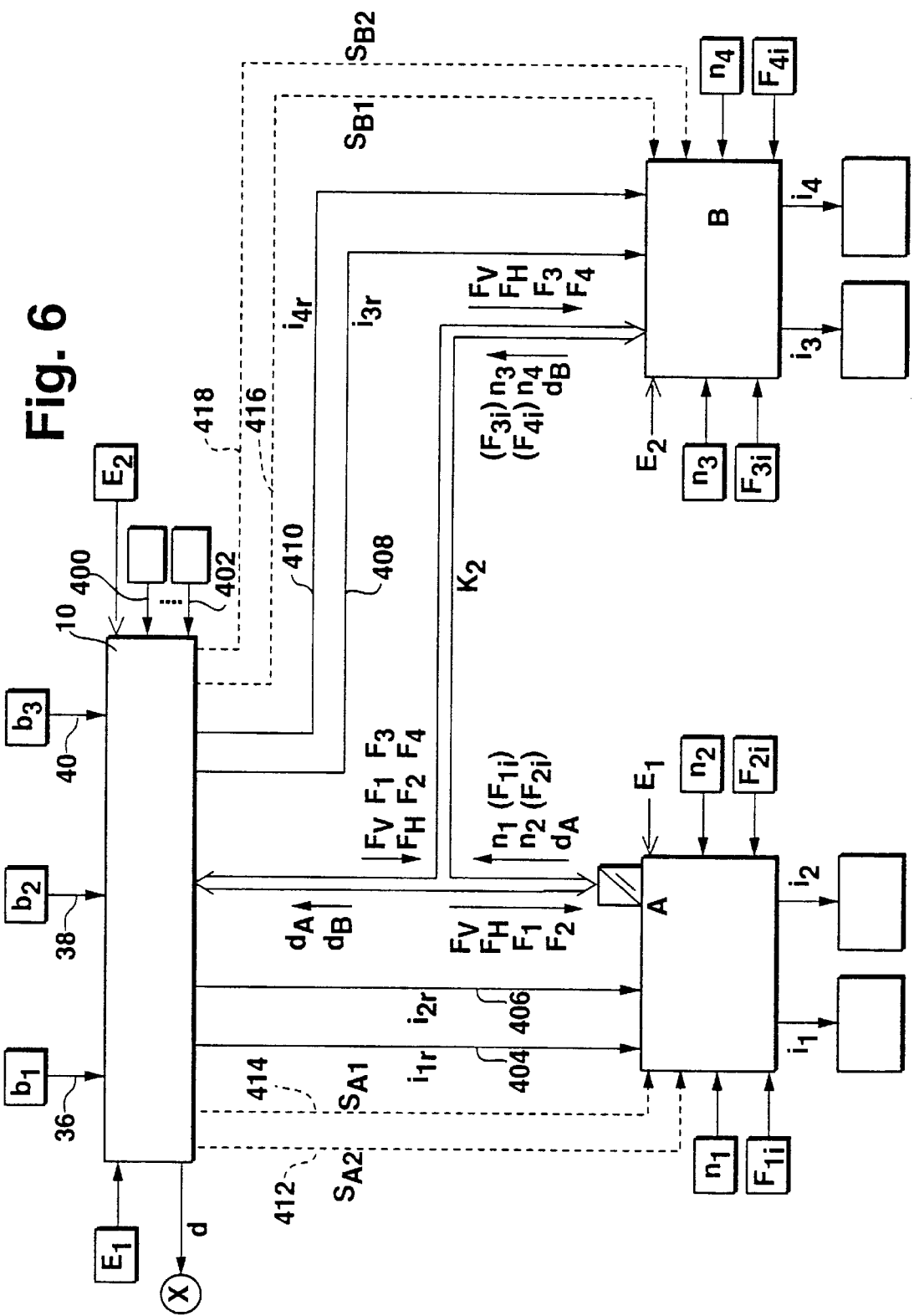
FIGS. 6–8 describe two variants of a second exemplary embodiment.
Figure 7:
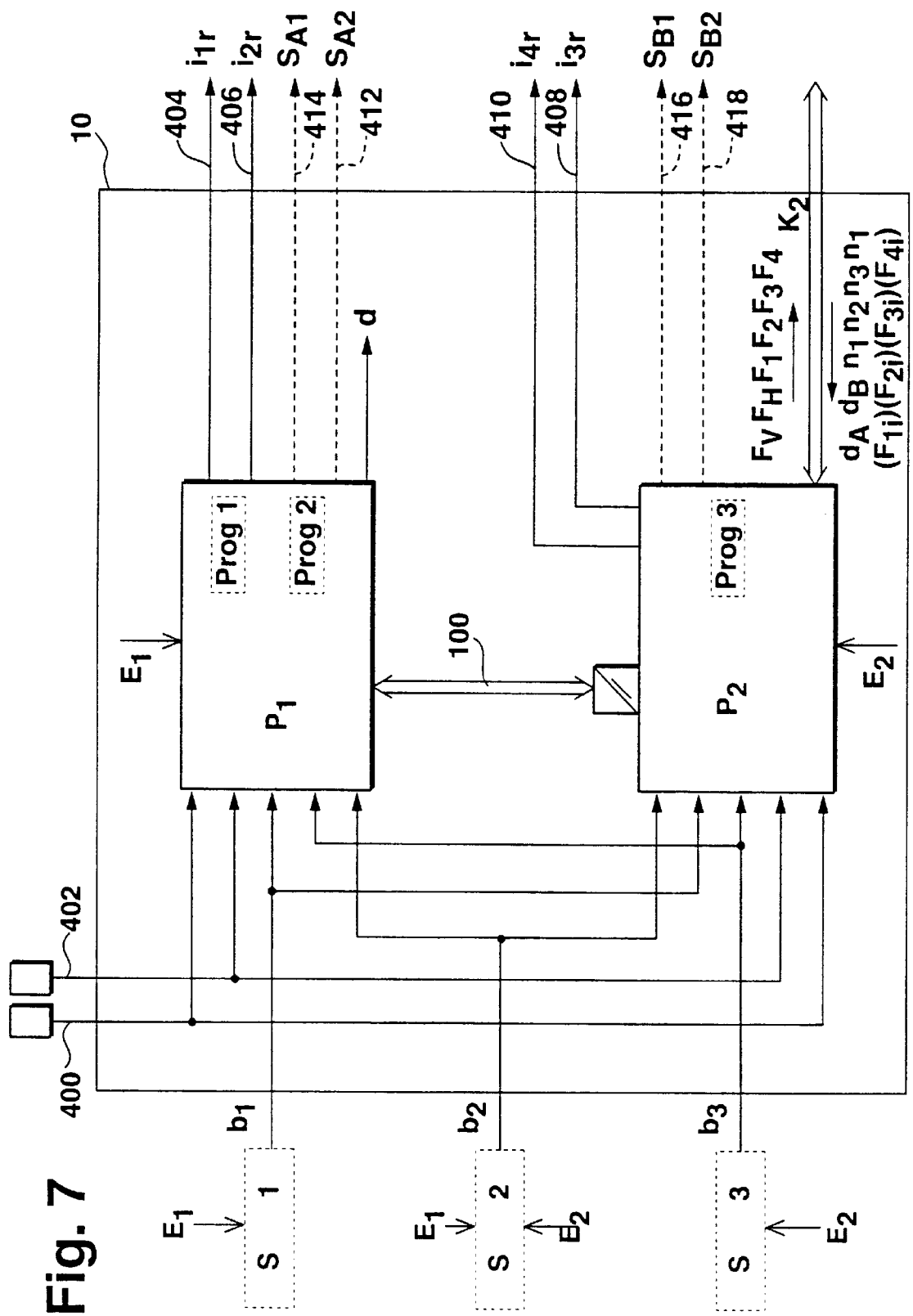
Figure 8:
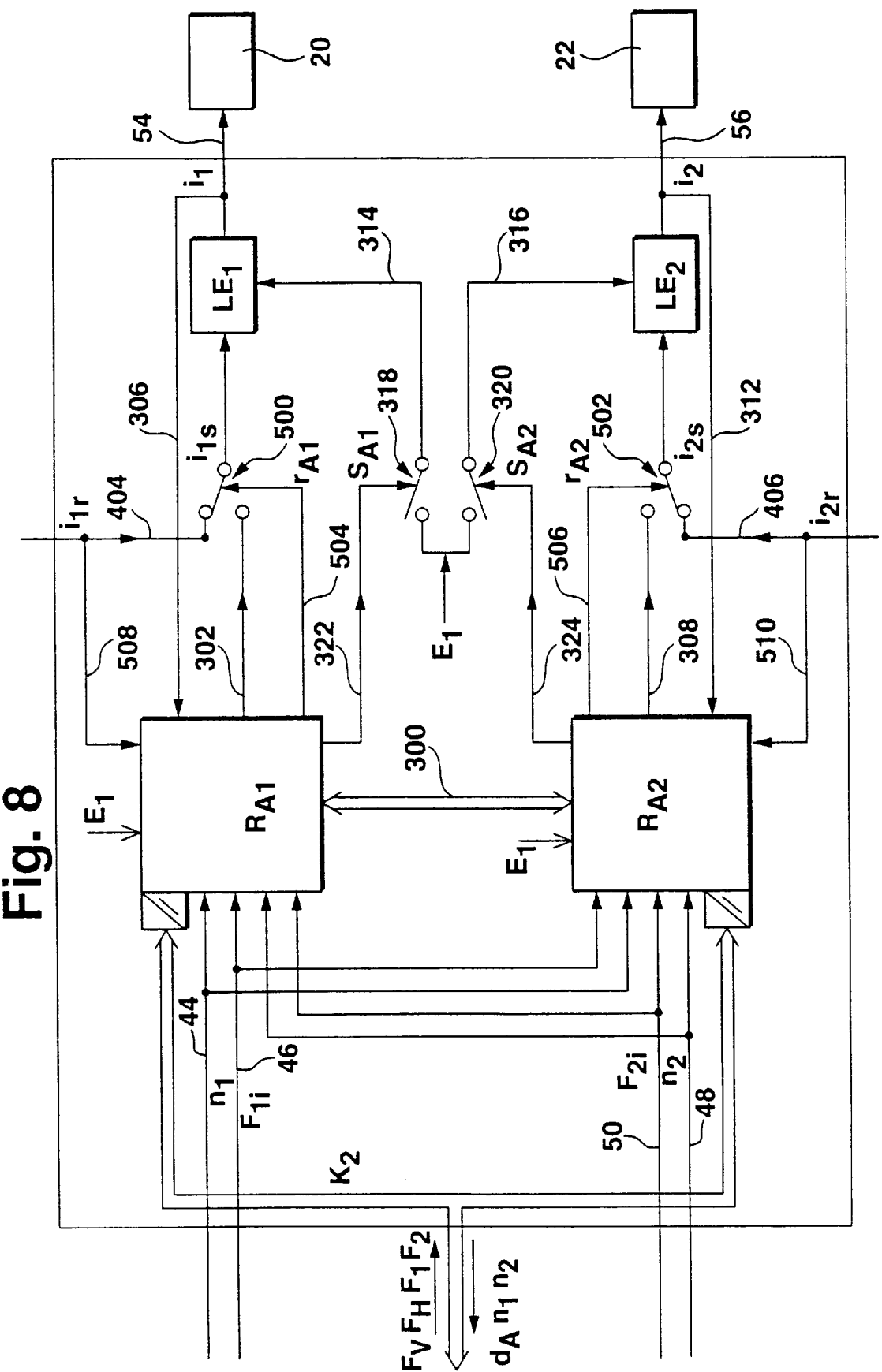

A second embodiment of the electronic brake system is illustrated in FIGS. 6–8. In this exemplary embodiment, in contrast to the exemplary embodiment according to FIG. 1, the processing unit is omitted, and only one communications system $K_2$ is present. The functions of the processing unit described on the basis of the exemplary embodiments of FIGS. 1–5 are realized within the pedal unit. When no defects are present, the pedal unit and the two wheel pair units communicate with each other exclusively via communications system $K_2$. When the communications system fails or in the case of defects within the microcomputer systems of the wheel pair units, controlled operation is maintained by direct intervention of the pedal unit in the electronic power supply of the defective unit via substitute variables $i_{1r}$, $i_{2r}$, $i_{3r}$ and/or $i_{4r}$.

As illustrated in FIG. 6, the pedal unit is provided not only with the variables (e.g., $b_1$, $b_2$, $b_3$) known from FIG. 1 but also with operating variables pertaining to driving dynamics, these signals being sent over input lines 400–402 from appropriate measuring devices. In addition, the defect variables $d_A$, $d_B$ of the wheel pair units, the rotational velocities $n_1$–$n_4$ of the wheels, and, in an alternative exemplary embodiment, the actual values $F_{1r}$–$F_{4r}$ (see parenthetical expressions in FIG. 6) of the braking forces or torques are also sent to the pedal unit over communications system $K_2$. Over lines 404, 406, 408, 410, which are independent of communications system $K_2$, the pedal unit transmits substitute variables ( $i_{1r}$, $i_{2r}$, $i_{3r}$, $i_{4r}$) for driving the actuators to wheel pair units A, B in the case of a defect. In the alternative exemplary embodiment, furthermore, lines 412, 414, 416, 418, which are also independent of communications system $K_2$, are provided, over which the pedal unit can transmit actuating signals $S_{A1}$, $S_{A3}$, $S_{B1}$, $S_{B2}$ to the wheel pair units to control the energy being sent to the electronic power supplies of the wheel pair units. The wheel pair units themselves correspond essentially to those known from the first exemplary embodiment according to FIG. 1. They are connected to communications system $K_2$, and one of the wheel pair units is preferably separated in terms of its voltage. They receive the command variables, individual to both the axle and the wheel ($F_H$, $F_V$, $F_1$–$F_4$), from the pedal unit and transmit rotational speeds $n_1$–$n_4$ of the wheels, defect signals $d_A$, $d_B$, and, in the alternative exemplary embodiment, the actual values of the braking forces or torques $F_{1r}$–$F_{4r}$ over the communications system to the pedal unit. The wheel pair units are connected to different vehicle electrical systems; and, as in the exemplary embodiment according to FIG. 1, they detect the rotational speeds of the assigned wheels and the actual values of the braking forces. In addition, the substitute actuating variables and, in the alternative exemplary embodiment, the actuating signals for the energy supply, are sent to the wheel pair units by the pedal unit. The wheel pair units actuate the actuators of the assigned wheel brakes via the lines already known from FIG. 1.

The structure of pedal unit 10, which has been modified in comparison with that of the exemplary embodiment of FIG. 2, is shown in FIG. 7. In contrast to the diagram according to FIG. 2, the measurement variables required for implementing the higher-level functions carried out in the processing unit according to FIG. 1 are also sent to the two microcomputers $P_1$, $P_2$. These higher-level functions, which were described above on the basis of the processing unit, are calculated redundantly in both microcomputers of the pedal unit. The results are exchanged between the microcomputers and compared to determine if any defects are present. If the results or partial results are inconsistent, the axle-specific command variable $F_V$ and $F_H$ are sent to the wheel pair units for processing. In the opposite case, i.e., if the results are consistent, the wheel-specific command variables $F_1$–$F_4$ are made available via communications system $K_2$ to wheel pair units A, B. Communications system $K_2$ is connected to only one microcomputer (e.g., to $P_2$). This has the advantage that, if this communications system fails, the pedal unit can maintain brake control by way of the other microcomputer over the redundant communications routes. If communications system $K_2$ fails, both microcomputers calculate substitute variables $i_{1r}$–$i_{4r}$, which serve in the case of a defect as substitute command variables for the automatic control of the braking force or torque. These signals are sent by the microcomputers in each case to a wheel pair unit independently of the communications system. They are generated on the basis of the driver's braking command and are directly related to the distribution of the braking forces between the front and rear axle. In the preferred exemplary embodiment, these signals represent the correcting variables for the electronic power supplies of the wheel modules and are designed as pulse width-modulated voltage signals. If the two actuators of the wheel pair units are assigned to the same vehicle axle, the substitute variables for the wheel pair unit are identical and can be combined into one signal path. In the case of defects within the microcomputers of a wheel pair unit or in the event of the failure of a wheel pair unit, the substitute variables are substitute correcting variables for the electronic power supplies of the actuators involved in the defect. In the case of a defect in the communications system or in a wheel pair unit, therefore, the pedal unit is able to maintain the operational capacity of the braking apparatus on an emergency control basis. As described above, the functions implemented in the pedal unit are calculated in parallel by the independent programs Prog1–Prog3 of microcomputers $P_1$, $P_2$, and the results are compared with each other in the two microcomputers for the purpose of detecting defects and selecting the correct results.

Within the scope of an alternative design, the analytical redundancy used to check the correctness of the calculation of the correcting variables for the wheel pair units is realized in the pedal unit, in a manner similar to that of the corresponding exemplary embodiment according to FIG. 1, in which the analytical redundancy was produced in the processing unit. For this purpose, actual values $F_{1r}$–$F_{4r}$ are sent from wheel pair units A, B to the pedal unit via $K_2$. In the case of a defect, the switching signals for the energy supply are generated by the pedal unit and transmitted via lines 412–418 to the wheel pair units in question.

The structure of the wheel pair units in this exemplary embodiment is sketched in FIG. 8. Wheel pair units A, B are of nearly identical design. Because wheel pair unit B is supplied by a different electrical system and because the communications system is also supplied by the same electrical system, wheel pair unit A according to FIG. 8 is separated in terms of its voltage from communications system $K_2$. The structure of the wheel pair units corresponds essentially to that described in conjunction with FIG. 4. The new feature is that switching elements 500, 502 are inserted in lines 302, 308, respectively. When actuated by their assigned microcomputers, these switching elements separate the connection between the microcomputer and the electronic power supply in question via lines 504, 506 and connect the electronic power supplies to lines 404, 406. In addition, the substitute actuating variables on lines 404, 406 are accepted as input via lines 508, 510 by the microcomputers. The wheel pair units thus obtain redundant microcomputer systems and a redundant coupling of the communications system and the peripheral input assemblies (wheel velocities, actual values). The correctness of the calculated correcting variables is ensured here, too, by comparison of the results between the two computer systems as described on the basis of FIG. 4. If the results of an automatic control function are inconsistent, and also in the absence of the trigger signal of a watchdog unit, the system switches over to the substitute value of the unit in question by means of the actuating signal ($r_{A1}$–$r_{B2}$) assigned to the microcomputer in question. All substitute variables are detected periodically by the microcomputers during defect-free operation. Their correctness is then checked by comparison operations based on the proportional relationship between them and command variables $F_V$, $F_H$. If an actuator is actuated because of a defect in an electronic power supply, this is recognized by a plausibility test of the relationship between the correcting variable and the controlled variable, as described above. If there is an unallowed relationship, the energy being sent to the electronic power supply in question is disconnected by one of the control signals $S_{A1}$–$S_{B2}$. In the preferred exemplary embodiment, this is done by the microcomputers of the wheel pair units themselves.

In an alternative embodiment (not shown), the communications system and the input assemblies are connected over a single channel to a microcomputer system such as that according to FIG. 5 or, in a suitable distribution, to two microcomputer systems. The signal exchange between the microcomputer systems is then realized by way of a computer interface. In this case, the energy switching signals originate from the pedal unit, to which the actual values are transmitted to provide the basis for the analytical redundancy.

In summary, it is to be observed that, in the exemplary embodiment described on the basis of FIGS. 6–8, higher-level brake functions are executed in the pedal unit, as a result of which nearly identical realizations of the wheel pair units are possible. Computer system and peripheral assemblies are realized in the pedal unit in redundant fashion. In the event of a defect, only a controlled type of operation by way of the substitute variable is possible. In an alternative exemplary embodiment, both wheel pair units are realized as single channels, and an analytical redundancy is implemented additionally in the pedal unit. Here, too, controlled operation via the substitute variable is possible in the event of a defect. A reduced design, in which the substitute variables act only on the actuators of the front axle, is advantageous. Similarly, the functions of the two microcomputers of one wheel pair unit can be combined into a single computer system.

Figure 9:
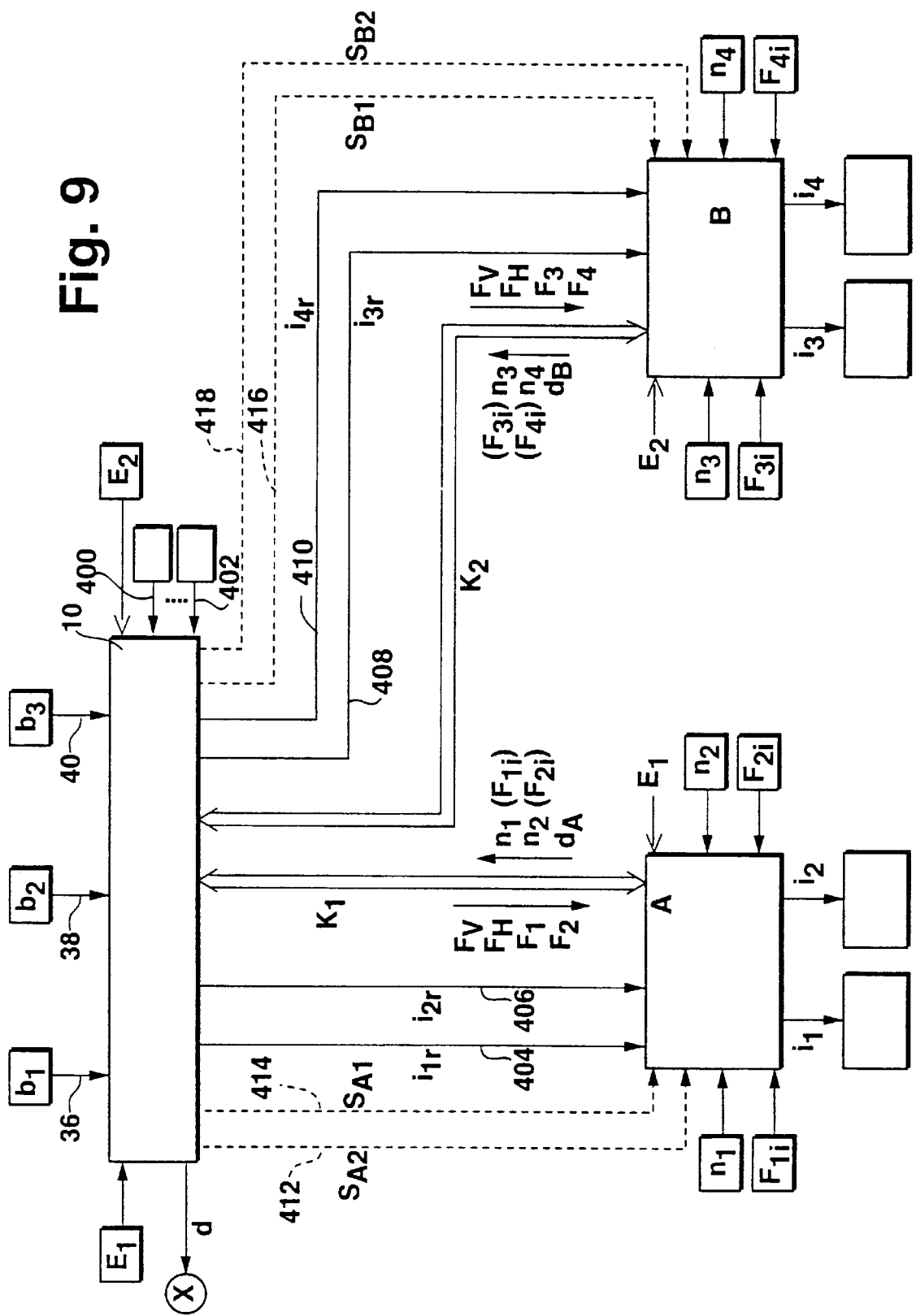
FIG. 9 shows a third exemplary embodiment.

A third embodiment of the brake system according to the invention is illustrated on the basis of FIG. 9, which shows the structure of the overall system. The key difference between this and the exemplary embodiment according to FIG. 6 is that the additional communications system $K_1$ leads from the pedal unit to wheel pair unit A, whereas communications system $K_2$ merely establishes the connection between the pedal unit and wheel pair unit B. As a result, the units undergo certain changes, which consist in that microcomputer $P_1$ of the pedal unit is additionally connected to communications system $K_1$, and in that, as a result of the introduction of communications system $K_1$, which is supplied by energy source $E_1$, the voltage separation in one of the wheel pair units is eliminated. How this embodiment works can be derived from the preceding exemplary embodiment.

Here, too, the higher-level brake functions are executed in the pedal unit. Because, in addition, the communications systems are realized in symmetric fashion, it is possible for the wheel pair units to be realized in the same way. The computer system and the peripheral assemblies in the two wheel pair units are realized in redundant fashion. When a defect occurs, only a controlled type of operation based on the substitute variable is possible, as also in the second exemplary embodiment according to FIG. 6. If a single-channel realization of the wheel pair units is selected, an analytical redundancy must be realized in the pedal unit. Here, too, the brake system is designed symmetrically with respect to the wheel pair units. Each wheel pair unit then has two independent computers, each of which drives an actuator in a manner completely separate from the other.

Figure 10:
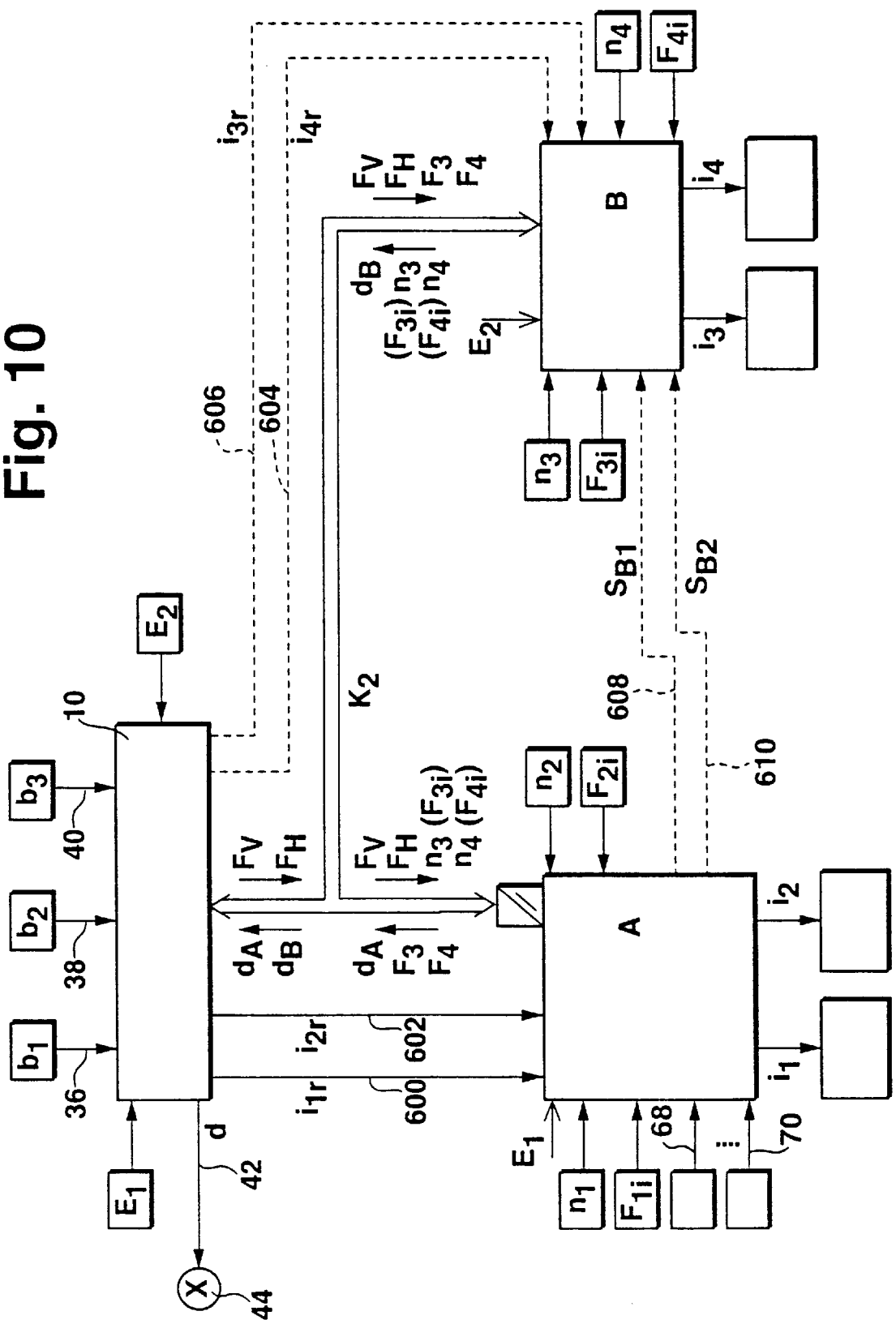
FIGS. 10–12 show a fourth exemplary embodiment of the brake system according to the invention.
Figure 11:
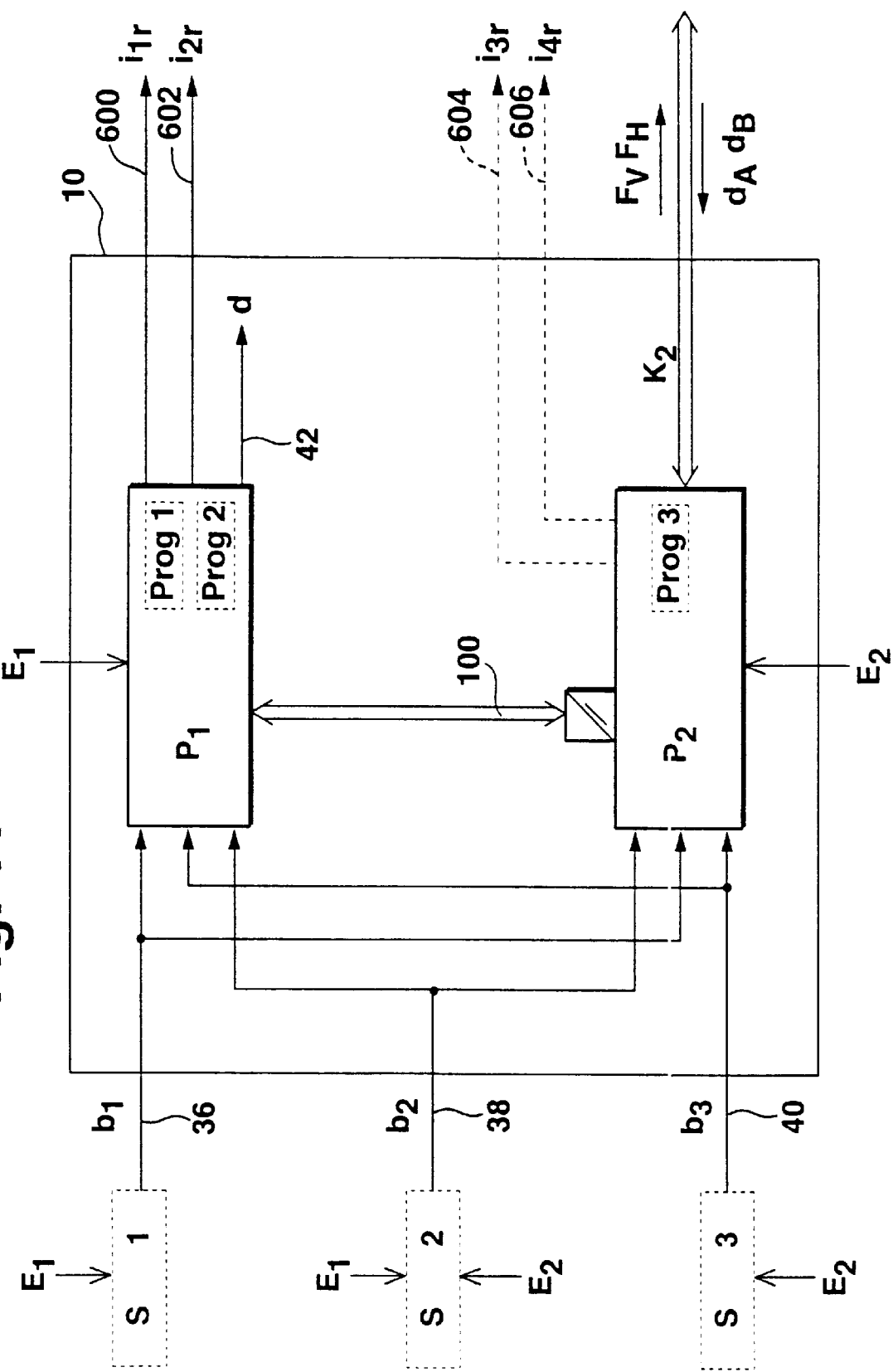
Figure 12:
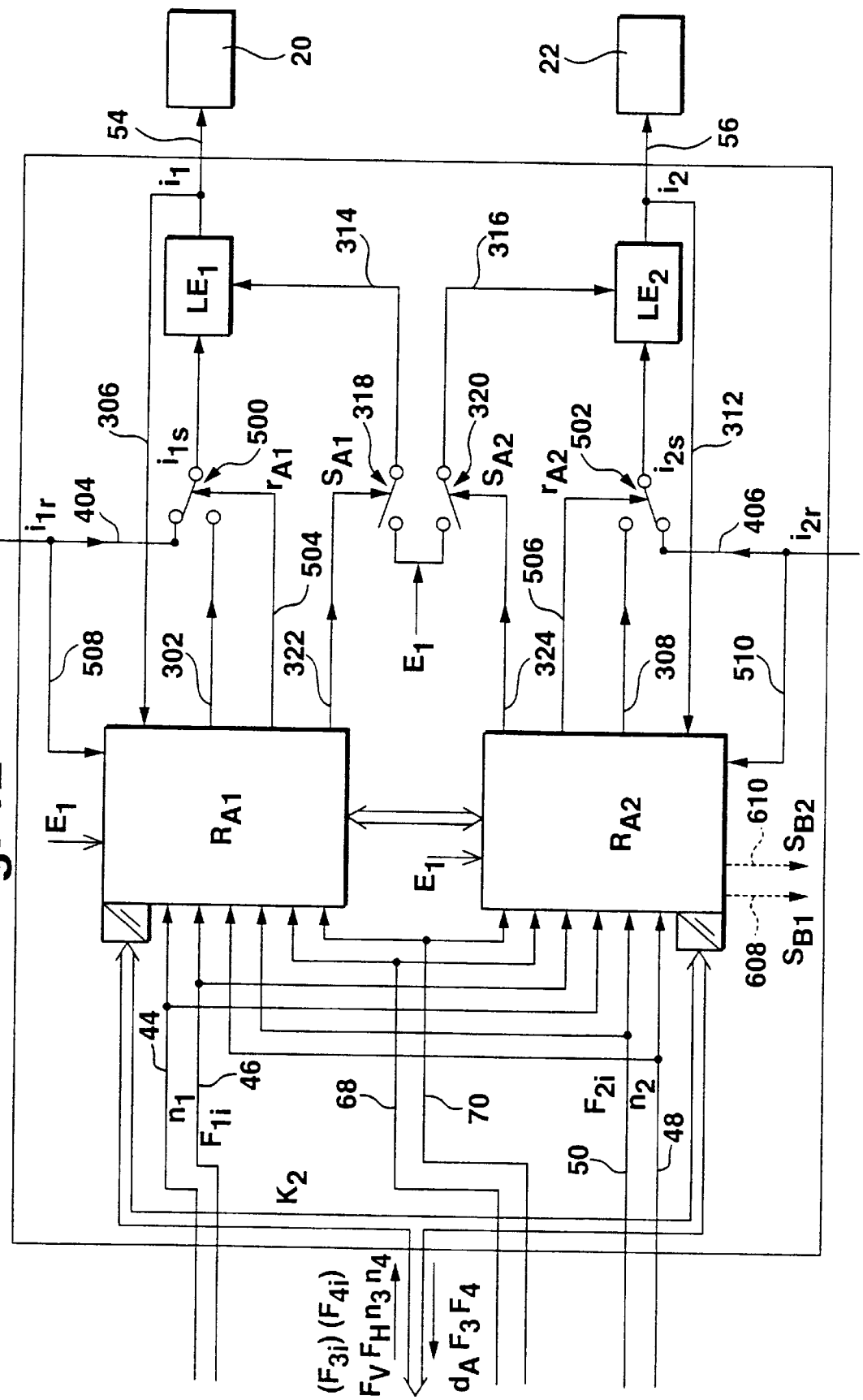

A fourth design is described in FIGS. 10–12. The key difference between this design and the structure of the brake system according to FIG. 1 is that the functions of the processing unit are incorporated into wheel pair unit A.

Pedal unit 10, in addition to the inputs for power supply and detection of the driver's command, also has a connection to communications system $K_2$, over which it receives defect signals $d_A$, $d_B$ from the wheel pair units and transmits command variables $F_V$, $F_H$ for the vehicle axles, formed as a function of the driver's command. In an expanded version, furthermore, the pedal unit has output lines 600, 602, over which substitute variables $i_{1r}$, $i_{2r}$ are transmitted to wheel pair unit A, which executes the functions of the processing unit. In a second expanded version, the pedal unit has output lines 604, 606, over which substitute actuating variables $i_{3r}$, $i_{4r}$ are transmitted to wheel pair unit B. Wheel pair unit A is connected to communications system $K_2$ with voltage separation, because, in contrast to communications system $K_2$, it is connected to electrical system $E_1$. It receives the axle-specific command variables from the pedal unit; it also receives rotational speed signals $n_3$, $n_4$ and, according to an alternative design, the actual values $F_{3i}$, $F_{4i}$ from wheel pair unit B. Wheel pair unit A transmits its defect signal $d_A$ and the wheel-specific command variables $F_3$, $F_4$ for wheel pair unit B over the communications system. In addition, wheel pair unit A accepts as input the values necessary for the higher-level functions and also the measurement values of the assigned wheels. In the manner described above, it actuates actuators 1, 2 of the assigned wheel brakes. Wheel pair unit B is connected to electrical system $E_2$. It receives axle-specific and wheel-specific command variables ($F_V$, $F_H$, $F_3$, $F_4$) over the communications system and transmits its defect signal $d_B$, the rotational speed signals $n_3$, $n_4$ of the assigned wheels, and possibly actual values $F_{2i}$, $F_{4i}$ pertaining to the produced braking forces or torques over the communications system. In an alternative exemplary embodiment, lines 608, 610 supplementally connect wheel pair unit A to wheel pair unit B. Over these lines, wheel pair unit A has the opportunity to transmit actuating signals $S_{B1}$, $S_{B2}$ to cut off the power to wheel pair unit B. In addition, wheel pair unit B detects the relevant variables of the assigned wheels and wheel brakes and actuates the actuators of the assigned wheel brakes in correspondence with the preceding description.

FIG. 11 shows the pedal unit. It differs from the pedal unit according to FIG. 2 in that, instead of a communications system, a one-wire or two-wire connection 600, 602 for transmitting the substitute variables is connected to microcomputer $P_1$. In an expanded version, lines 604, 606, which transmit the substitute variables to wheel pair unit B, are also connected to microcomputer $P_1$. In addition to the functions for calculating the command variables $F_V$, $F_H$ shown on the basis of FIG. 2, substitute variables $i_{1r}$, $i_{2r}$, which go into effect in the event of a defect, are calculated as a function of the driver's braking command. If the communications system fails, these signals serve as substitute command variables for the automatic control of the braking force or torque. If defects occur within the microcomputers of wheel pair unit A, then $i_{1r}$, $i_{2r}$ are substitute correcting variables for the electronic power supplies of the actuators affected by the defective function. Signals $i_{1r}$, $i_{2r}$, are formed according to the procedure described on the basis of FIG. 7. in the expanded version, the pedal unit also forms corresponding substitute variables $i_{3r}$, $i_{4r}$ for wheel pair unit B, which are sent to it in the event of a defect. These substitute variables are formed in a similar way. In the exemplary embodiment according to FIG. 11 as well, independent programs of the microcomputers serve, as described on the basis of FIG. 2, to determine the nominal values and substitute values as well as to detect defects.

FIG. 12 shows the structure of wheel pair unit A, in which the functions of the processing unit are integrated. Microcomputers $R_{A1}$, $R_{A2}$ are connected to electrical system $E_1$, which means that voltage separation with respect to communications system $K_2$ supplied by electrical system $E_2$ is necessary. In addition, the microcomputers accept as input in redundant fashion the measurement values of the assigned wheels and brakes as well as additional measurement values (lines 68–70). On the output side, the design of wheel pair unit A is the same as that shown in FIG. 8.

The wheel pair unit also takes over the functions of the processing unit. It is supplied by energy source $E_1$ and is realized by a redundant microcomputer system. The wheel-specific rotational speeds $n_1$, $n_2$, the braking forces or torques, and the measurement values required for execution of the higher-level functions are also built into the circuit in redundant fashion. In a simplified embodiment, both communications system $K_2$ and the measurement values corresponding to the design of FIG. 5 operate on only one channel. The calculations for the higher-level functions and also for the automatic braking force or torque controls are executed in both microcomputers. The results are exchanged over the communications channel and, in the case of nonagreement, a defect message is sent. If the results of an automatic control function are inconsistent, and also if the trigger signal of a watchdog unit is not received, the system is switched over to substitute variables $i_{1r}$, $i_{2r}$ of the affected units by signals $r_{a1}$, $r_{a2}$. The two substitute variables are detected periodically by microcomputers $R_{A1}$, $R_{A2}$, respectively, during operation in the absence of defects. During their proportional relationship to the axle-specific command variables, their correctness is checked by comparison with these command variables. If a defect in one of the electronic power supplies leads to an undesired actuation of an actuator, this can be recognized by means of a plausibility test between the correcting variable and the controlled variable. In this case, the power being sent to the electronic power supply is cut off by the corresponding microcomputer by way of one of the actuating signals $S_{A1}$, $S_{A2}$. In addition, if wheel pair unit B is a single-channel design, wheel pair unit A incorporates the analytical redundancy for the functions of wheel pair unit B (compare FIG. 5). For this purpose, the actual measurement values of the braking forces or torques are processed in addition. If the results are inconsistent, microcomputer $R_{A2}$ transmits signals $S_{B1}$, $S_{B2}$ to turn off the energy supply within wheel pair unit B.

Wheel pair unit B has a two-channel design in accordance with FIG. 4. In a one-channel design, the structure of wheel pair unit B corresponds to that of FIG. 5.

In addition, a design is advantageous in which substitute actuating variables are also sent to wheel pair unit B by the pedal unit. Thus, the energy being sent to the electronic power supply is not shut off by actuating signals $S_{B1}$, $S_{B2}$ formed by wheel pair unit A in the event of a defect; instead, the system is switched over to control by the substitute variables. The wheel pair unit then has the design shown in FIG. 8 on the output side.

In the exemplary embodiment shown, the higher-level brake functions are integrated into wheel pair unit A, which is turned off in the event of a defect. The data flow from the pedal unit to the other system components occurs under normal operating conditions via a communications system. Each of the two wheel pair units has two independent shut-off paths for actuating the actuators (energy supply and substitute value). If the communications system fails, automatically controlled operation is still possible in wheel pair unit A through the use of substitute values. If wheel pair unit A is behaving defectively, controlled braking operation can be maintained by the same substitute values. Wheel pair unit B has the same type of defect behavior because of its redundant design. In the case of a one-channel realization of wheel pair unit B, the defect behavior is ensured by an analytical redundancy in wheel pair unit A. In addition, this design can also be expanded in such a way that, in the event of defect, a controlled brake intervention by way of the substitute variable is also possible in wheel pair unit B.

In addition to the use of the electronic brake system according to the invention in brakes actuated by electric motors, the brake system can also be used in electrically controlled hydraulic or pneumatic brake apparatuses.

In an advantageous exemplary embodiment, the units described are realized as individual control devices, which are installed near the corresponding components (wheel brakes, brake pedal, etc.). In other exemplary embodiments, the unit can be combined in any desired way in one or more control devices.

We claim:

1. Electric braking system for a vehicle, comprising:
   a control unit (10) which determines at least the driver's braking requirement;
   control modules (A, B) which control the braking force at the wheels of the vehicle based upon the driver's braking requirement;
   at least one communication system (K1, K2), which connects the control unit (10) with the control modules (A, B) for transmitting data between the control unit and the control modules; and
   at least two mutually independent electrical systems (E1, E2) for power supply, the control unit (10) is connected with the at least two electrical systems for power supply, whereby the control modules (A, B) are each only connected with one of the at least two electrical systems for power supply.

2. A brake system according to claim 1, wherein the control module detecting the driver's braking command is connected to two communications systems, each of which are independent of each other.

3. A brake system according to claim 1, wherein the control modules actuate groups of wheel brakes, each control module being connected by way of separate communications systems to the control module for detecting the braking command and to a processing unit.

4. A brake system according to claim 1, wherein a processing unit is provided which executes higher-level functions such as driving dynamics control, antilock protection, and drive slip control.

5. A brake system according to claim 4, wherein the higher-level functions are calculated in one of the control modules, said control module being connected by way of a communications system to a pedal unit and to at least one other control module, and in the event of a defect, said module receiving substitute variables from the pedal unit over connecting lines.

6. A brake system according to claim 1, wherein the control modules drive electrically motorized brake actuators.

7. A brake system according to claim 1, and a communications system connecting a pedal unit to the control modules, and additional communications links independent thereof over which, in the event of a defect, substitute variables can be transmitted from the pedal unit to the control modules.

8. A brake system according to claim 1, wherein the higher-level functions are executed by a pedal unit.

9. A brake system according to claim 1, and further comprising connecting control modules to a pedal unit, and connecting lines parallel to the communications systems, over which substitute variables are transmitted from the pedal unit to the control modules.

10. A brake system according to claim 1, wherein each of the control modules are assigned to the brakes of a respective set of wheels, said sets being the wheels on an axle of said vehicle, or diagonal wheels.

11. Electric braking system for a vehicle, comprising:
- a control unit (10) which determines at least the driver's breaking requirement;
- control modules (A, B) which control the braking force at the wheels of the vehicle based upon the driver's braking requirement;
- an evaluation unit (18) which determines desired values representing the braking forces at each wheel;
- at least one communication system (K1, K2), which connects the control unit (10) with the evaluation unit (18) and with the control modules (A, B) for transmitting data between these elements, wherein the control unit (10) determines the desired values (FH, FV) representing the braking forces to be applied at the brakes of the rear axle and the front axle respective based on the driver's braking requirement, and where the evaluation unit (18) forms the desired values (F1 to F4) representing the braking forces to be applied at the wheels of the vehicle based on the desired values formed by the control unit (10), and where the control modules (A, B) control the wheel brakes based on at least one of the desired values forming by the control unit (10) and by the evaluation unit (18).

12. Electric braking system for a vehicle, having actuators (20, 22, 24, 26) at each wheel being controlled by actuation signals, comprising:
- a control unit (10) which determines at least the driver's braking requirement;
- control modules (A, B) which control the braking force at the wheels of the vehicle based upon the driver's braking requirement;
- at least one communication system (K1, K2), which connects the control unit (10) with the control modules (A, B) for transmitting data between the control unit and the control modules;
- separate communications lines between the control unit and the control modules, whereby the control unit (10) determines desired values (F1 to F4) based on the driver's braking requirement and the control unit (10) further determines actuation signals (i1r, i2r, i3r, i4r) based on the driver's braking requirement and sends the actuation signals via said separate communication lines to the control modules, the control modules controlling the wheel brakes based on at least one of the desired values and the actuation signals.

* * * * *

UNITED STATES PATENT AND TRADEMARK OFFICE
CERTIFICATE OF CORRECTION

PATENT NO. : 5,952,799
DATED : September 14, 1999
INVENTOR(S) : Maisch, et. al.

It is certified that error appears in the above-identified patent and that said Letters Patent is hereby corrected as shown below:

In cover page, in the section entitled Foreign Application Priority Data, line 30, change "196 34 567" to -- 196 34 567.7 --.
In column 3, line 58, change "$F_v$" to -- $F_{v'}$ --.
In column 5, line 39, change "$R_v$" to -- $R_{v1}$ --.

In column 5, line 54, change "$F_{4'}$" to -- $F_{4i'}$ --.

Signed and Sealed this

Twenty-fourth Day of October, 2000

Attest:

Q. TODD DICKINSON

Attesting Officer

Director of Patents and Trademarks